United States Patent [19]

Reed

[11] B 3,999,622
[45] Dec. 28, 1976

[54] VEHICLE SPEED CONTROL
[75] Inventor: David F. Reed, Kansas City, Mo.
[73] Assignee: Borg-Warner Corporation, Chicago, Ill.
[22] Filed: Oct. 3, 1974
[21] Appl. No.: 511,907
[44] Published under the second Trial Voluntary Protest Program on March 30, 1976 as document No. B 511,907.
[52] U.S. Cl. ............................ 180/108; 123/103 R
[51] Int. Cl.² ........................................ B60K 31/00
[58] Field of Search ........................ 180/108, 110; 123/103 R, 108

[56] References Cited
UNITED STATES PATENTS

| | | | |
|---|---|---|---|
| 3,198,280 | 8/1965 | Ostrom | 180/108 |
| 3,249,176 | 5/1966 | Dangler | 123/103 R X |
| 3,322,227 | 5/1967 | Thorner | 180/108 |
| 3,368,640 | 2/1968 | Bremer et al. | 180/108 |

Primary Examiner—Kenneth H. Betts
Assistant Examiner—R. Schrecengost
Attorney, Agent, or Firm—James A. Geppert

[57] ABSTRACT

A pneumatic speed control device for an automotive vehicle that derives its power from a vehicle engine manifold vacuum and is an adaptive control which maintains a constant vehicle speed by means of changing the throttle position due to a deviation from vehicle speed which has been selected by the driver. This device includes a differential control valve for controlling a vacuum signal leading to a bellows actuating the throttle linkage of the vehicle and a speed sensing device including a control valve for a vacuum signal proportional to the vehicle speed and communicating with one side of a diaphragm in the differential control valve; the opposite side of the diaphragm communicating with an accumulator of a fixed volume which receives the vacuum signal from the speed sensing device and is isolated therefrom once the desired cruising speed is reached.

19 Claims, 4 Drawing Figures

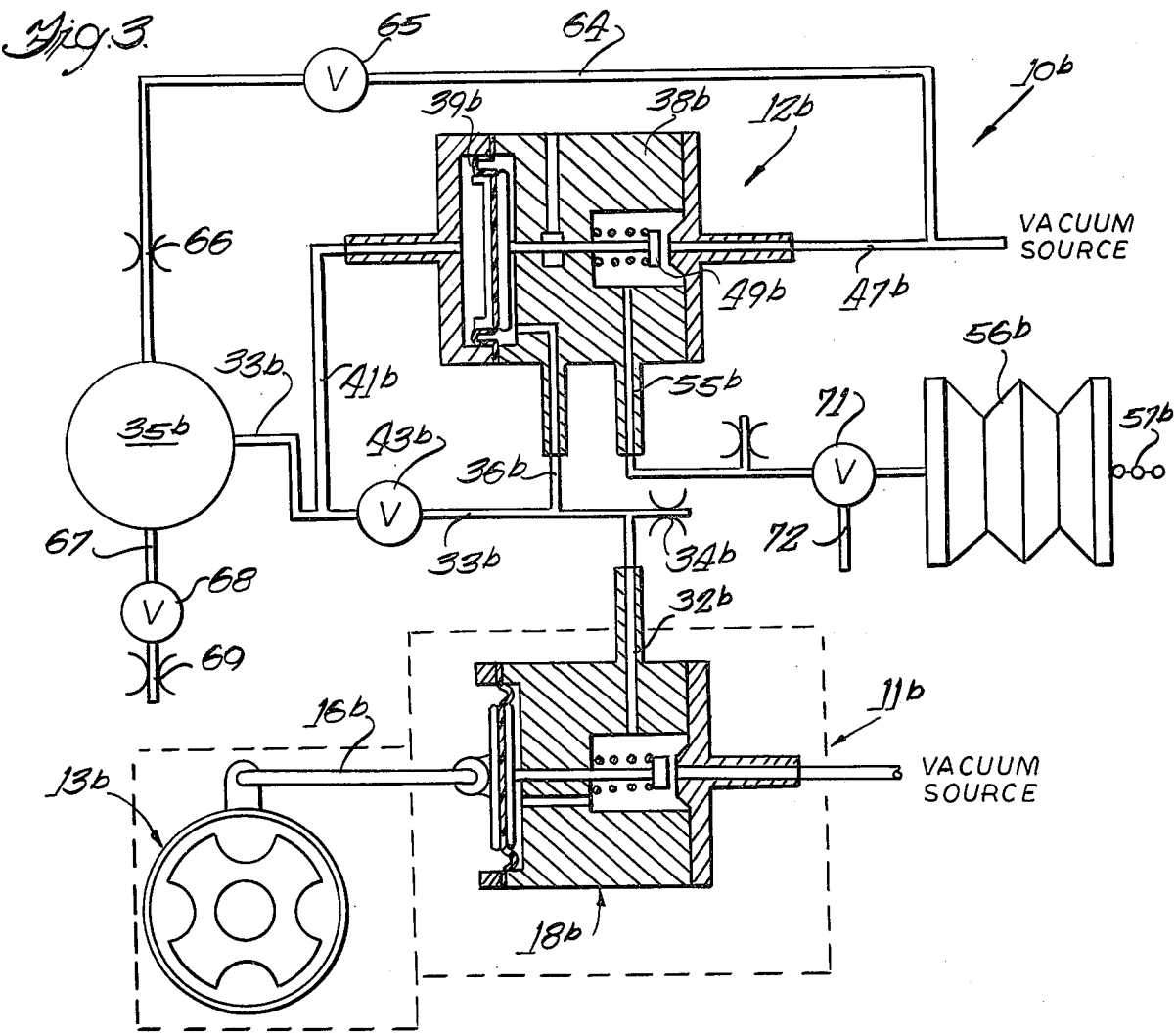
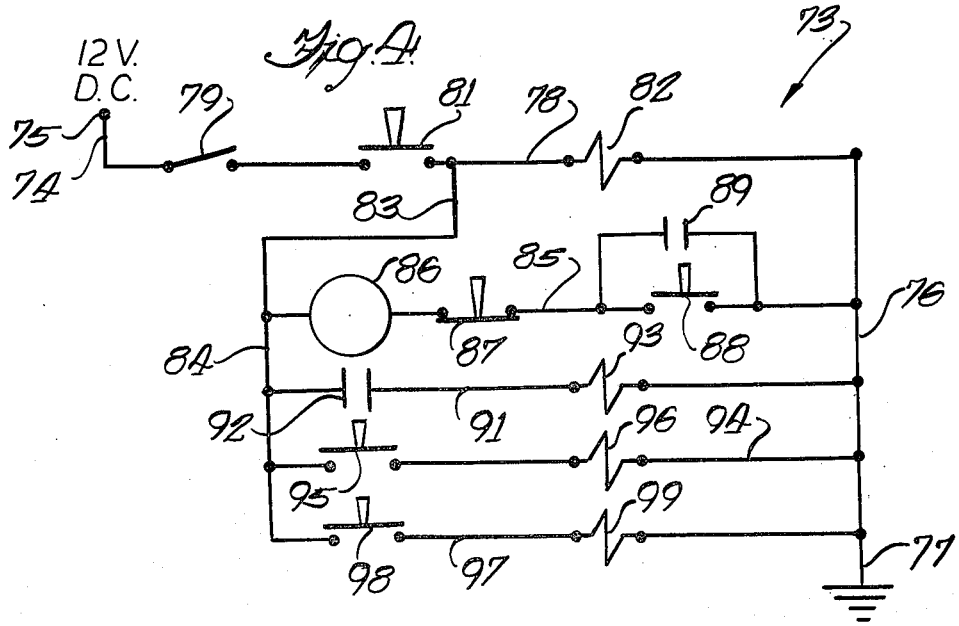

3,999,622

VEHICLE SPEED CONTROL

BACKGROUND OF THE INVENTION

Over the past several years, a substantial number of automatic speed controls or cruise controls for automotive vehicles have been developed. Depending on the mode of actuation, many of these systems are extremely complex and involve highly sophisticated electronic or mechanical constructions. As an example, one version of an electronic speed control utilizes an electronic memory with almost instantanous speed memorization and single wire transmission of control signals from the steering wheel to a computer as a vehicle-velocity control device. Such a device involves complex circuitry to provide the operations of sensing the speed of the vehicle, a low speed cutout, memory and comparitor, a driver amplifier, a throttle feedback circuit, and brake disabling circuits.

Other types of speed control devices may incorporate magnetic speed sensing means, fluid pressure modulators, and intake manifold air pressure or vacuum means. However, many of such prior devices required expensive proportioning valves and solenoids for proportioning and metering the flow of actuating fluids within the speed controlling system, and the complexity and cost of such systems has made them prohibitive for general application to vehicles and virtually impossible for addition to vehicles once the vehicles were manufactured and sold by the original vehicle builder.

SUMMARY OF THE INVENTION

The present invention relates to an automotive vehicle speed control device and more particularly to a novel speed control device that is pneumatic and derives its power from the engine manifold vacuum in a simplified manner.

Among the objects of the present invention is the provision of a novel automotive vehicle speed control device which is pneumatic and derives its power from the engine manifold vacuum. The device involves a minimum number of parts and provides a simplified and positive operation for a constant speed. The device utilizes a feedback control system which includes a speed sensor, a differential control valve, a small accumulator of a fixed volume, and a bellows or similar actuating means which is suitably connected to the throttle linkage for the vehicle. The speeds sensing means controls the vacuum or negative pressure which is communicated to both the differential control valve and the small accumulator. Once the vehicle reaches the desired speed, direct communication between the speed sensing device and the accumulator is interrupted.

The differential control valve includes a diaphragm wherein the vacuum from the speed sensing device communicates with a chamber on one side of the diaphragm and the opposite side of the diaphragm communicates with the accumulator which now has a fixed negative pressure. At the desired vehicle speed, the pressure on both sides of the diaphragm are equal and the differential control valve is closed; however, if the speed of the vehicle begins to drop, the speed signal decreases and the negative pressure contained in the accumulator tends to move the diaphragm to open the valve allowing vacuum to actuate the bellows, thus opening the throttle and accelerating the vehicle.

Another object of the present invention is the provision of a novel automatic vehicle speed control device wherein a high sensitivity is achieved by using a vacuum pump as the speed signal source and selecting a large diaphragm to be used in the differential control valve. In this embodiment, the fixed volume accumulator and the bellows, or equivalent means actuating the throttle, are arranged in the same manner with the differential control valve, with the only difference being utilization of the vacuum pump in place of the speed sensing device previously utilized.

A further object of the present invention is the provision of a novel automotive vehicle speed control device where the components of the device can be easily arranged to incorporate desirable features providing the functions of acceleration, deceleration or resume speed with a minimum of additional cost. These functions require the addition of valves communicating with the fixed volume accumulator and a simple control circuit having a series of solenoids to actuate the various valves for the desired functions.

Further objects of the present invention are to provide a construction of maximum simplicity, efficiency, economy, and ease of assembly and operation, and such further objects, advantages and capabilities as will later more fully appear and are inherently possessed thereby.

DESCRIPTION OF THE DRAWINGS

FIG. 3 is a schematic showing of a third embodiment of the present invention.

FIG. 4 is a control circuit utilized with the embodiment of speed control device shown in FIG. 3.

DESCRIPTION OF THE PREFERRED EMBODIMENTS

Figure 1:
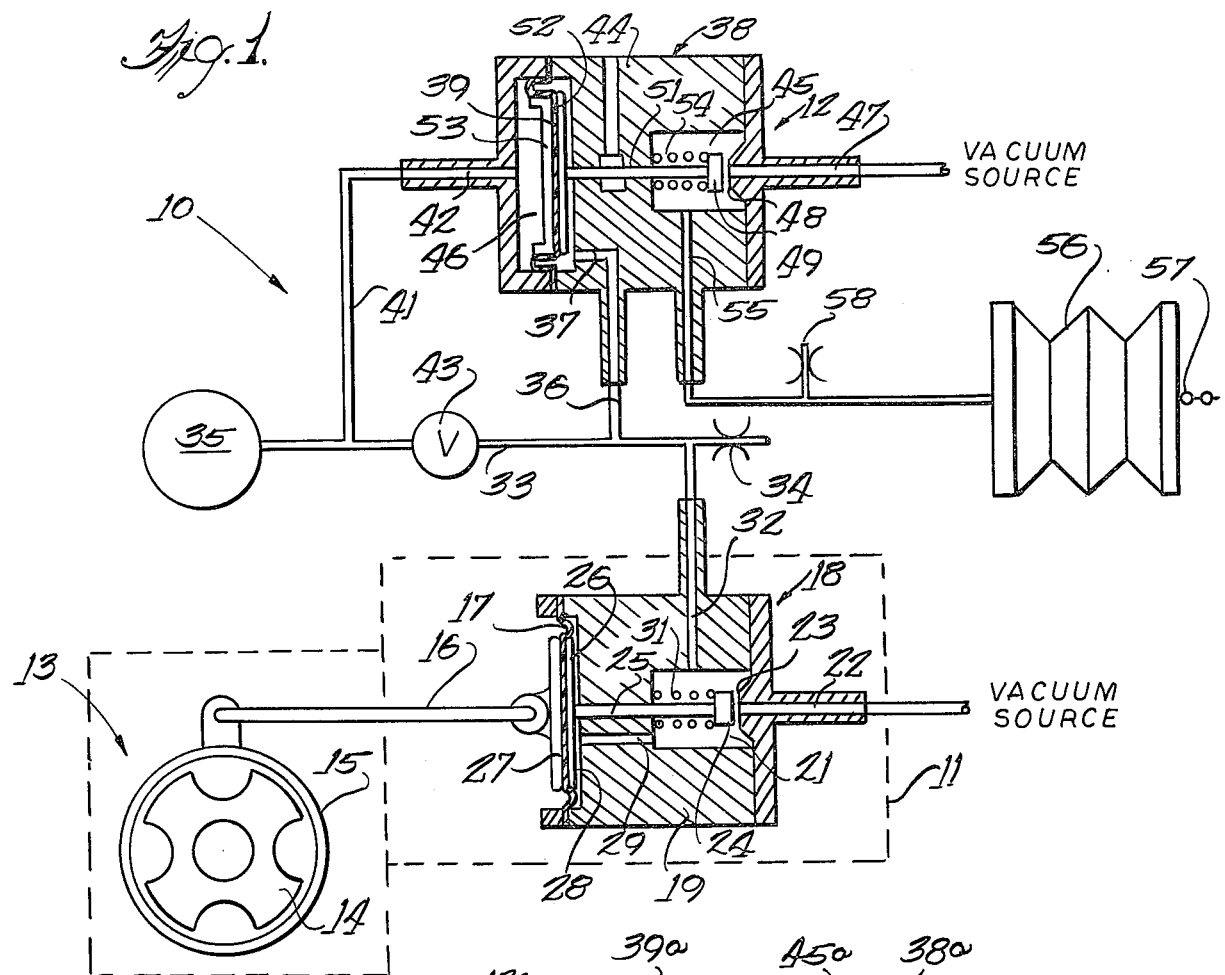
FIG. 1 is a schematic showing of one embodiment of the pesent invention of a speed control for a vehicle.

Referring more particularly to the disclosure in the drawings wherein are shown illustrative embodiments of the present invention, FIG. 1 provides a schematic showing of a speed control device 10 for an automotive vehicle which includes a speed sensing device 11 and a throttle control device 12. The speed sensing device 11 includes a conventional drag cup unit 13 comprising a rotating magnetic member 14 which is suitably connected to the speedometer cable or other speed indicating system and a housing or cup 15 encompassing the rotating magnetic member and capable of limited arcuate movement depending upon the drag exerted thereon by the magnetic field of the member 14. The cup 15 is connected through a linkage 16 to the diaphragm 17 of a control valve 18 for the speed sensing device.

The control valve 18 includes a valve body 19 having a central chamber 21 with a passage 22 in the end of the valve opposite to the diaphragm 17 and communicating with a vacuum supply (not shown), such as from the engine intake manifold. A valve seat 23 encompasses the inner end of the passage 22 and cooperates with a valve member 24 on a valve stem 25 which extends through the valve body and is secured at its opposite end to a diaphragm plate 26. A second diaphragm plate 27 on the opposite side of the diaphragm 17 is suitably secured to the plate 26 to sandwich the central portion of the diaphragm therebetween; the diaphragm plate 27 being suitably connected to the linkage 16 from the drag cup. The diaphragm 17 is secured at its peripheral edge in the valve body 19 and forms with a recess in the end of the valve body a chamber 28 which communicates with the central chamber 21 through a passage 29 paralleling the valve stem 25. A compression spring 31 encompasses the valve stem 25 with one end of the spring engaging the valve member 24 and the opposite end of the spring engaging the valve body 19 so as to yieldably urge the valve member against the valve seat 23 to close the passage 22. An outlet passage 32 extends laterally from the valve body 19 to communicate with the throttle control device 12.

The throttle control device 12 includes a vacuum passage or line 33 which is intersected by the outlet passage 32 from the control valve 18 and extends between a bleed orifice 34 and a fixed volume accumulator 35. A branch passage 36 communicates between the line 33 and a passage 37 leading to one side of a diaphragm 39 in a differential control valve 38. A second branch line intersects the vacuum line 33 at a point spaced from the branch line 36 and communicates with a passage 41 in one end of the control valve communicating with the opposite side of the diaphragm 39. A normally open valve 43 is positioned in the vacuum line 33 between the branch lines 36 and 41 and acts to isolate the pressure in the accumulator 35 as will later be more fully described.

The differential control valve 38 includes a valve body 44 having a central chamber 45 and a diaphragm chamber 46 with the diaphragm 39 being secured at its periphery in the valve body to divide the chamber into opposite portions communicating with the passages 37 and 42. A vacuum supply passage 47 is positioned in the end of the valve body opposite to the passage 42 and communicates with the central chamber 45; a raised valve seat 48 surrounding the inner end of the passage 47 and adapted to cooperate with a valve member 49 secured to one end of a valve stem 51. The valve stem 51 extends through the valve body into the diaphragm chamber 46 and is secured at its opposite end to a diaphragm plate 52; a second diaphragm plate 53 being positioned on the opposite side of the diaphragm and suitably secured to the plate 52. A compression spring 54 encompasses the valve stem 51 to yieldably urge the valve member 49 against the valve seat 48. A vacuum outlet passage 55 is located in the valve body 44 communicating with the central chamber 45 and leading to a bellows 56 which is connected to a throttle linkage chain 57; and a bleed orifice 58 is positioned to intersect the passage 55 between the valve body and the bellows.

In operation, the magnetic member 14 rotates at a speed which is proportional to the speed of the vehicle and, due to the drag of the magnetic field, causes the drag cup to be moved through an arc of movement to actuate the diaphragm 17 through the linkage 16. Movement of the diaphragm and the diaphragm support plates 26 and 27 moves the valve member 24, through the valve stem 25, away from the valve seat 23 against the force of the spring 31 to open the vacuum supply passage 22. Thus, the drag torque on the drag cup is converted to a negative pressure substantially proportional to the speed of the vehicle. The speed signal in the form of the negative pressure is fed through the outlet passage 32, the vacuum line 33, the normally open control valve 43, and the branch lines 36 and 41 to both sides of the diaphragm 39 in the diaphragm chamber 46. As the vacuum line 33 also communicates with the accumulator 35, the negative pressure is also fed to the accumulator. Once the desired cruising speed is reached and the negative pressure is equalized in the system, the control valve 43 is closed to isolate the fixed volume accumulator 35 from the speed signal. At this point, the throttle and the bellows 56 achieve a position to retain the vehicle operating at the set speed.

When the speed of the vehicle begins to drop, the speed signal decreases as the valve member 24 moves back towards the valve seat 23 to create less vacuum in the system. With less vacuum being fed through the passage 37 to the right hand side of the diaphragm chamber 46, the diaphragm 39 will move to the left due to the pressure imbalance on the opposite sides thereof, thus moving the valve member 49 from the valve seat 48 to allow vacuum from the vacuum supply (not shown) to enter the central chamber 45 through the vacuum supply passage 47 and exit through the outlet passage 45 to the bellows 56. The vacuum will tend to collapse the bellows and thus open the throttle (not shown) to accelerate the vehicle to return to the desired fixed operating speed. When the vehicle returns to the desired speed, the vehicle speed signal is equal to the pressure in the fixed volume accumulator 35 and the pressure is equalized at both sides of the diaphragm 39, so that the differential control valve is closed and the negative pressure in the bellows 56 is vented to atmosphere through the bleed orifice 58.

Figure 2:
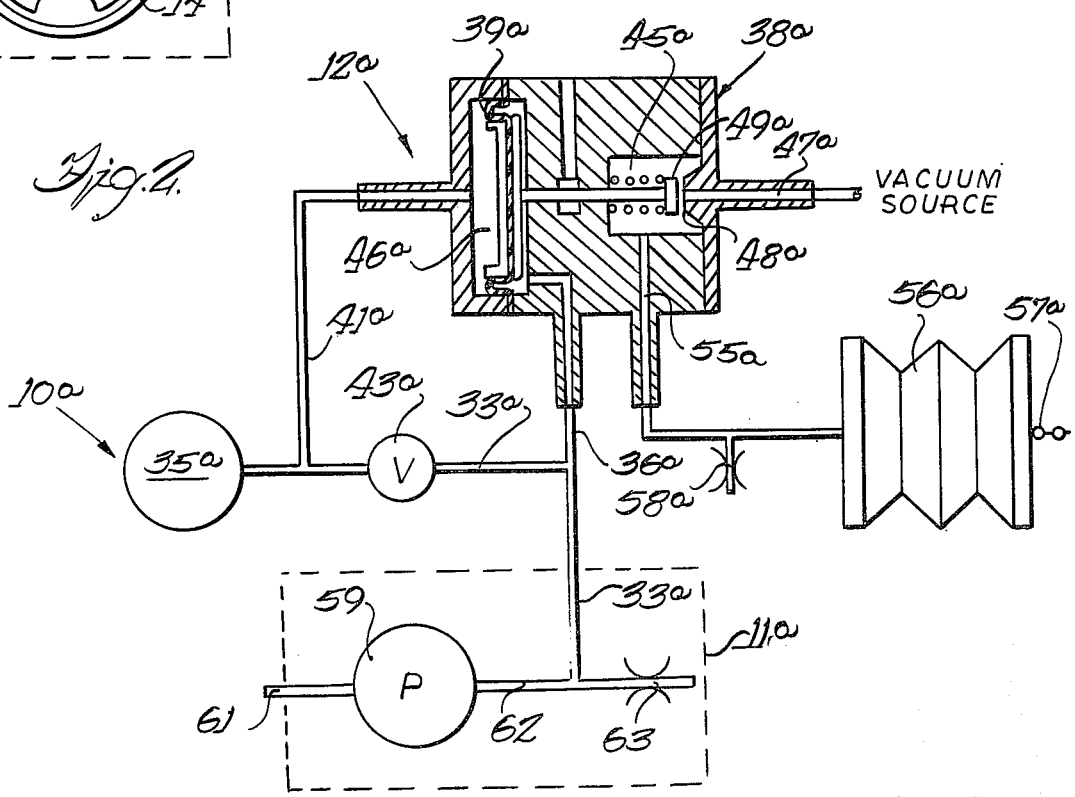
FIG. 2 is a schematic showing of a second embodiment of the present invention.

FIG. 2 discloses an alternate embodiment of speed control device 10a including a speed sensing device 11a and a throttle control device 12a, wherein the speed sensing device 11a consists of a vacuum pump 59 having an inlet line 61 and an outlet line 62 terminating in a bleed orifice 63. A vacuum line 33a intersects and leads from the outlet line 62 to the differential control valve 38a through the branch lines 36a and 41a. The throttle control device 12a of this embodiment is identical in structure with the device shown in FIG. 1 and the same reference numerals with the addition of an "a" are used to identify the components of this device.

Considering the operation of this embodiment, the vacuum pump 59 is driven by a speedometer cable or other speed sensing means whereby the pump produces a negative pressure signal which is proportional to the speed of the vehicle. The control valve 43a in the vacuum line 33a is retained open until the vehicle reaches the predetermined speed level for the cruising speed of the vehicle. Then the valve 43a is closed so that the fixed volume accumulator 35a is isolated from the speed signal and retains a specific negative pressure or vacuum. Also, the negative pressure is equalized in the diaphragm chamber 46a on both sides of the flexible diaphragm 39a. If the speed of the vehicle begins to drop, the vacuum pump decreases the vacuum so that the speed signal decreases, and the negative pressure contained in the isolated accumulator 35a tends to move the diaphragm 39a to the left, as seen in FIG. 2, to move the valve member 49a off of the valve seat 48a. The vacuum from the vacuum supply (not shown) passes through the passage 47a, the central chamber 45a and the outlet passage 55a to collapse the bellows 56a so that the throttle linkage chain 57a actuates the throttle to accelerate the vehicle. When the vehicle speed again reaches the predetermined level, the vehicle speed signal from the vacuum pump 59 is again equal to the pressure in the accumulator 35a, and the pressure within the diaphragm chamber 46a is equalized so that the differential control valve 38a closes and the negative pressure in the bellows 56a is vented to atmosphere through the bleed orifice 58a.

FIGS. 3 and 4 disclose another alternate embodiment of the present speed control device which is more versatile than those previously described as the vehicle operator can control the use of the control device through the electrical circuit shown in FIG. 4. The device 10b, as shown in FIG. 3, includes a speed sensing device 11b and a throttle control device 12b; the speed sensing device 11b being either the drag cup sensing device of FIG. 1 or the vacuum pump of FIG. 2. As shown in FIG. 3, a drag cup unit 13b is connected to a control valve 18b by linkage 16b; the valve having a vacuum source and an outlet passage 32b. The vacuum line 33b intersects the passage 32b and communicates with both sides of the diaphragm 39b in the differential control valve 38b through the branch lines 36b and 41b. The fixed volume accumulator 35b is connected to the vacuum line 33b at one end thereof with the opposite end of the line terminating in a bleed orifice 34b. Also, a control valve 43b is positioned in the vacuum line 33b between the branch lines 36b and 41b in the same manner as shown in FIGS. 1 and 2. A second vacuum line 64 is connected to the fixed volume accumulator 35b and intersects the vacuum supply passage 47b leading to the differential control valve 38b; a second control valve 65 being positioned in the vacuum line 64 with an orifice 66 positioned in the line 64 adjacent the accumulator 35b. A third vacuum line 67 also communicates with the fixed volume accumulator 35a and is open to the atmosphere, with a third control valve 68 located in the line 67 and a bleed orifice 69 positioned beyond the valve. Also, a three-way valve 71 is positioned in the vacuum outlet passage 55b between the bellows 56b and the differential control valve 38b and has a branch passage 72 to vent the valve to atmosphere.

The control circuit 73 for the speed control device 10b is shown in FIG. 4 and consists of a "ladder diagram" having a "hot" line 74 connected to the positive battery terminal 75 and a line or rail 76 is connected to ground at 77. A first line 78 extends between the "hot" line 74 and the ground rail 76 and includes an ignition switch 79 in series with a manually actuated on-off switch 81 and a first solenoid 82. A branch line 83 intersects the line 78 at a point between the on-off switch 81 and the solenoid 82, and extends to a "hot" rail 84 parallel to the ground rail 76. A second line 85 parallel to line 78 includes a control relay 86 in series with a normally closed brake switch 87 and a normally open "resume" switch 88. A pair of normally open relay contacts 89 for the control relay 86 are located in parallel with the "resume" switch 88. A third line 91 extending between the rails includes a second pair of open relay contacts 92 which are in series with a second solenoid 93. A fourth line 94 includes a normally open "acceleration" switch 95 in series with a third solenoid 96, and a fifth line 97 includes a normally open "deceleration" switch 98 in series with a fourth solenoid 99.

The first solenoid 82 acts to control the normally open control valve 43b in the vacuum line 33b, while the second solenoid 93 acts to control the three-way valve 71 which is in a normal venting position. The third solenoid 96 actuates the second control valve 65 in the second vacuum line 64, and the fourth solenoid 99 actuates the third control valve 68 in the third vacuum line 67. Also, the normally closed brake switch 87 is operatively connected to the brake pedal of the vehicle such that depression of the pedal will open the normally closed momentary contact brake switch 87 to deenergize the circuit.

The operation of the system shown in FIGS. 3 and 4 can only occur when the ignition switch 79 is closed, and opening the ignition switch disarms the control system and destroys the "memory" so that inadvertent operation at a high speed is impossible. Once the ignition switch 79 is closed, the control system 73 may be energized by actuating the maintain contact type on-off switch 81. Upon switch closure, the first solenoid 82 is energized to close the normally open control valve 43b and isolate the pressure in the fixed volume accumulator 35b at the desired speed level; the control valves 65 and 68 being normally closed to thus isolate the accumulator from the pressure system. The speed control system will then be set into operation by depressing the "resume" button or switch 88, which is a momentary contact, normally open switch. A circuit is thus completed from the "hot" line 74 through the ignition switch 79, on-off switch 81, branch line 83, "hot" rail 84, and the second line 85 to energize the control relay 86. Energization of the control relay 86 will close the first set of normally open contacts 89 in parallel with the "resume" switch 88 to lock in the circuit even though the switch 88 is released and reassumes its normally open position. Actuation of the relay 86 also closes the second set of relay contacts 92 in the third line 91 to energize the second solenoid 93, which actuates the three way valve 71 to change the connection of the bellows 56b from vent to metered vacuum.

If the driver desires to disarm or disconnect the control system, he may depress the brake pedal (not shown) to open the normally closed, momentary contact brake switch 87 and deenergize the control relay 86, thus opening the relay contacts 89 and the second line 85. Releasing the brake pedal will again close the brake switch 87, however, the circuit remains open until the "resume" switch 88 is closed. It should be noted that even though the brake pedal has been depressed, the control valve 43b was not deenergized as the on-off switch 81 remains closed, and the pressure in the fixed volume accumulator 35 remains constant. Therefore, the same set-point speed may be reattained by closing the "resume" switch 88.

If the set-point speed is too slow to suit the driver, he may depress the "acceleration" button to close the momentary contact, normally open acceleration switch 95. The switch closure energizes the solenoid 96 in the fourth line to actuate the second control valve 65 which opens the line 64 leading from the vacuum supply passage 47b to the fixed volume accumulator 35b. This line has the orifice 66 therein so as not to cause too rapid of a pressure change in the accumulator. As long as the "acceleration" button is depressed, the pressure in the fixed volume accumulator 35b will continue to be reduced which, in turn, changes the set-point speed upward by actuating the diaphragm 39b to open the valve member 49b and allow communication of the vacuum supply line 47b with the bellows 56b to actuate the vehicle throttle. When the vehicle has attained the desired increased velocity, the "acceleration" button is released to open the circuit through the line 94 and deenergize the solenoid 96 to close the second control valve 65 causing the pressure in the accumulator 35b to be fixed at the new level. The speed will remain at this new higher velocity until either the circuit is opened by depressing the brake pedal or the speed is changed by a further adjustment.

Similarily, if the driver desires to decrease the set-point speed, he depresses the "deceleration" button to close the momentary contact, normally open switch 98. This switch closure in the fifth line 97 energizes the fourth solenoid 99 which opens the third control valve 68 in the line 67 leading to the accumulator 35b. The control valve 68 vents the fixed volume pressure to atmosphere through an orifice 69. The set-point speed point will continue to be reduced as long as the "deceleration" button is depressed and, when a new lower speed is reached, the "deceleration" button is released to open the circuit through the line 97 and deenergize the fourth solenoid 99 to close the third control valve 68. The vehicle will then operate at this new lower speed until either the circuit is opened or a new set-point speed is required.

When the brake pedal is depressed to open the brake switch 87 in the second line 85, the deenergization of the control relay 86 opens the first relay contacts 89 and the second relay contacts 92. The opening of the contacts 89 opens the circuit through the second line 85; while the opening of the contacts 92 deenergizes the solenoid 93 which will actuate the three-way valve 71 to return to the venting to atmosphere position to vent the bellows 56b, thus releasing the throttle to decelerate the vehicle and allow manual actuation of the throttle by the driver. Also, the first solenoid 82 is deenergized by opening the on-off switch 81 which will return the control valve 43b to its normally open position and vent the fixed volume accumulator 35b through the orifice 34b. Therefore, the control device shown in FIGS. 3 and 4 of the drawings provides a complete control system for the vehicle which can be automatically adjusted to either a higher or lower set-speed or be deactivated by depression of the brake pedal or by the opening of the on-off switch.

I claim:

1. A speed control device for an automotive vehicle comprising a speed sensing device for the vehicle, a source of vacuum controlled by the sensing device to vary said vacuum with vehicle speed, a fixed volume storage means for said variable vacuum and a differential control means operatively connected to the sensing device to receive a vacuum signal therefrom, including a control valve having a diaphragm, a vacuum control valve member operatively connected to said diaphragm, one side of said diaphragm communicating with said sensing device and the opposite side communicating with said storage means, a second vacuum source controlled by the vacuum control valve member to provide a signal from the control valve, throttle actuating means controlled by the signal from the control valve, and interrupting means between the sensing means and the storage means which is actuatable to isolate the storage means from the sensing device.

2. A speed control device for an automotive vehicle comprising a speed sensing device for the vehicle, a source of vacuum controlled by the sensing device to provide a vacuum signal, a fixed volume accumulator and a differential control valve operatively connected to the sensing device through a vacuum line communicating between said sensing device and said accumulator to receive the vacuum signal therefrom, a diaphragm in said differential control valve, a pair of spaced branch lines from the vacuum line to the opposite sides of the diaphragm, a source of vacuum controlled by the differential control valve to provide a vacuum signal therefrom, throttle actuating means controlled by the vacuum signal from the differential control valve, and a normally open line valve positioned in said vacuum line between said branch lines which, when closed, isolates the accumulator and one side of the diaphragm from the vacuum signal of the sensing device.

3. A speed control device as set forth in claim 2, in which said differential control valve includes a vacuum control valve member operatively connected to said diaphragm to control the vacuum signal from the control valve to the throttle actuating means.

4. A speed control device as set forth in claim 3, wherein said vehicle is brought up to the desired speed with the line valve open to provide a vacuum signal to both the accumulator and the differential control valve and, at the desired speed level, the line valve is closed, and any change in the speed level will change the vacuum signal from the sensing device to cause an imbalance on the opposite sides of the diaphragm and actuate the differential control valve so that the vacuum signal therefrom actuates the throttle actuating means.

5. A speed control device as set forth in claim 3, in which the throttle actuating means comprises a bellows receiving the vacuum signal from the differential control valve and is operatively connected to a throttle for the vehicle.

6. A speed control device as set forth in claim 2, in which said speed sensing device includes a drag cup actuated by the speed of the vehicle and a speed signal valve actuated by said drag cup to provide a vacuum signal to said accumulator and said differential control valve.

7. A speed control device as set forth in claim 2, wherein said speed sensing device comprises a vacuum pump responsive to the vehicle speed to provide a vacuum signal 8. A speed control device as set forth in claim 7, in which the differential control valve has a diaphragm chamber receiving said diaphragm and a separate vacuum chamber communicating with the source of vacuum, said vacuum line communicating between the vacuum pump and the accumulator, and said spaced branch lines communicating with the opposite sides of the diaphragm chamber.

9. A speed control device as set forth in claim 8, in which said throttle actuating means comprises a bellows communicating with the vacuum chamber to receive the vacuum signal from the differential control valve and is operatively connected to the vehicle throttle.

10. A speed control device as set forth in claim 2, in which said speed sensing device provides a vacuum signal proportional to the speed of the vehicle, said diaphragm having one side communicating with said accumulator and the opposite side communicating with said speed sensing device, and said differential control valve providing a vacuum signal to said throttle actuating means proportional to the pressure imbalance across the diaphragm.

11. A speed control device for an automotive vehicle comprising a speed sensing device for the vehicle including a drag cup responsive to the speed of the vehicle, a diaphragm-actuated speed signal valve operatively connected to said drag cup and controlling a source of vacuum to provide a vacuum signal, a fixed volume accumulator and a differential control valve, a vacuum line connected to the speed signal valve to receive the vacuum signal therefrom and communicating with the accumulator, said diferential control valve having a diaphragm chamber and a vacuum chamber, a diaphragm in said diaphragm chamber and a valve member in said vacuum chamber and operatively connected to said diaphragm, a source of vacuum communicating with said vacuum chamber and controlled by said valve member to provide a vacuum signal therefrom, a pair of spaced branch lines communicating between the vacuum line and the opposite sides of the diaphragm chamber, a line valve positioned in the vacuum line between the branch lines and which, when closed, isolates the accumulator and one side of the diaphragm from the vacuum line, and throttle actuating means comprising a bellows communicating with the vacuum chamber to be controlled by the vacuum signal therefrom and operatively connected to the throttle for the vehicle.

12. A speed control device for an automotive vehicle comprising a speed sensing device for the vehicle, a source of vacuum controlled by the sensing device to provide a vacuum signal, a fixed volume accumulator and a differential control valve operatively connected to the sensing device to receive the vacuum signal therefrom, a vacuum line communicating between said sensing device and said accumulator, a diaphragm in said differential control valve having one side communicating with said accumulator and the opposite side communicating with said speed sensing device, a pair of spaced branch lines communicating between the vacuum line and the opposite sides of the diaphragm, a source of vacuum controlled by the differential control valve to provide a vacuum signal therefrom, throttle actuating means controlled by the vacuum signal from the differential control valve, a line valve positioned in said vacuum line between said branch lines which, when closed, isolates the accumulator from the sensing device, a second vacuum line communicating between said accumulator and the vacuum source for the differential control valve, and a second line valve in said second vacuum line.

13. A speed control valve as set forth in claim 12, including a vacuum relief line connected to said accumulator and opening to the atmosphere, and a third line valve in said vacuum relief line.

14. A speed control device as set forth in claim 13, including a three-way valve positioned between said differential control valve and said throttle actuating means to control the vacuum signal from said differential control valve, said valve having a first position venting said throttle actuating means to atmosphere and a second position connecting said means with said differential control valve.

15. A speed control device as set forth in claim 14, including an orifice positioned in the second vacuum line and in the vacuum relief line.

16. A speed control device as set forth in claim 14, including a control circuit actuating the first, second, third and three-way valves for control of the device to set the speed level, or increase or decrease the level.

17. A speed control device as set forth in claim 16, in which said circuit includes a solenoid to actuate each of the four valves arranged in parallel to each other between a hot line and a line to ground, and a normally open switch which, when closed, actuates its respective solenoid.

18. A speed control device as set forth in claim 16, in which said circuit includes a hot line and a ground line, a first line extending between said hot and ground lines, a first solenoid in said first line actuating said line valve, an on-off switch in said line, a second line in parallel with said first line, a control relay and a first normally open, momentary contact switch in said second line, means to retain the circuit closed upon closing of said last mentioned switch, a third parallel line containing a pair of normally open relay contacts actuated by said control relay and a second solenoid actuating said three-way valve, a fourth parallel line containing a second normally open, momentary contact switch and a third solenoid actuating said second line valve, and a fifth parallel line containing a third normally open, momentary contact switch and a fourth solenoid actuating said third line valve.

19. A speed control device as set forth in claim 18, in which said first line includes the vehicle ignition switches in series with the on-off switch and the first solenoid, a hot rail intersects the first line subsequent to said ignition and on-off switches and is connected to said second, third, fourth, and fifth lines, said second line including a normally closed, momentary contact switch which is opened by depressing the vehicle brake pedal to inactivate the control device, and said circuit retaining means includes a pair of normally open relay contacts in parallel with said first momentary contact switch and actuated by energization of said control relay.

* * * * *

UNITED STATES PATENT OFFICE
CERTIFICATE OF CORRECTION

PATENT NO. : 3,999,622
DATED : December 28, 1976
INVENTOR(S) : DAVID F. REED

It is certified that error appears in the above–identified patent and that said Letters Patent are hereby corrected as shown below:

Column 8, line 40, after "signal" insert -- to the accumulator and the differential control valve. --

Signed and Sealed this

Fifth Day of April 1977

[SEAL]

Attest:

RUTH C. MASON
Attesting Officer

C. MARSHALL DANN
Commissioner of Patents and Trademarks